(12) United States Patent
Laughlin et al.

(10) Patent No.: US 8,700,499 B2
(45) Date of Patent: *Apr. 15, 2014

(54) APPARATUS AND METHOD FOR CONTROLLING INVENTORY

(75) Inventors: Brian D. Laughlin, Wichita, KS (US); David R. Denny, Colwich, KS (US)

(73) Assignee: The Boeing Company, Chicago, IL (US)

( * ) Notice: Subject to any disclaimer, the term of this patent is extended or adjusted under 35 U.S.C. 154(b) by 163 days.

This patent is subject to a terminal disclaimer.

(21) Appl. No.: 12/826,088

(22) Filed: Jun. 29, 2010

(65) Prior Publication Data

US 2011/0029412 A1 Feb. 3, 2011

Related U.S. Application Data (63) Continuation-in-part of application No. 09/882,834, filed on Jun. 15, 2001, now Pat. No. 7,769,643.

(60) Provisional application No. 60/267,562, filed on Feb. 8, 2001.

(51) Int. Cl.
*G06Q 10/00* (2012.01)

(52) U.S. Cl.
USPC .............................................. 705/28; 705/29

(58) Field of Classification Search
USPC ......................................................... 705/28
See application file for complete search history.

(56) References Cited

U.S. PATENT DOCUMENTS

| | | |
|---|---|---|
| 5,638,519 A | 6/1997 | Haluska |
| 5,819,232 A | 10/1998 | Shipman |
| 5,893,076 A * | 4/1999 | Hafner et al. ................... 705/28 |
| 5,963,919 A | 10/1999 | Brinkley et al. |
| 5,983,202 A | 11/1999 | Yabe et al. |
| 6,151,582 A | 11/2000 | Huang et al. |
| 6,418,416 B1 | 7/2002 | Rosenberg et al. |
| 6,516,301 B1 | 2/2003 | Aykin |
| 6,937,992 B1 | 8/2005 | Benda et al. |

(Continued)

FOREIGN PATENT DOCUMENTS

WO    WO 03/005246 A2    1/2003

OTHER PUBLICATIONS

International Search Report and Written Opinion for International Application No. PCT/US2011/38363, mailed Nov. 30, 2011.

(Continued)

*Primary Examiner* — Garcia Ade
(74) *Attorney, Agent, or Firm* — Alston & Bird LLP (57) ABSTRACT

A system for providing products to a customer operates with an open purchase order having an acceptable inventory range bounded by a lower and an upper limit for each product supplied to the customer. The system includes a storage unit, a first processing unit that maintains a product inventory count, and a second processing unit that monitors the product inventory count. A system for transferring electronic files includes a first processing unit that stores and transfers the electronic file, generates a pointer associated with the transferred electronic file, generates a reference electronic file and thereafter includes the pointer in the reference electronic file. A second processing unit then displays the reference electronic file. A system for generating composite electronic files includes a first processing unit having composite locations including component electronic files, and generating the composite electronic files when the respective composite location is accessed from a second processing unit.

18 Claims, 9 Drawing Sheets

(56) References Cited

U.S. PATENT DOCUMENTS

| | | |
|---|---|---|
| 7,734,584 B1 | 6/2010 | McBarron et al. |
| 2002/0010659 A1 | 1/2002 | Cruse et al. |
| 2002/0019821 A1 | 2/2002 | Rosenbluth |
| 2002/0023122 A1 | 2/2002 | Polizzi et al. |
| 2002/0046125 A1 | 4/2002 | Speicher et al. |
| 2002/0072986 A1 | 6/2002 | Aram |
| 2002/0107753 A1 | 8/2002 | Laughlin et al. |
| 2002/0138336 A1 | 9/2002 | Bakes et al. |
| 2002/0188499 A1 | 12/2002 | Jenkins et al. |
| 2003/0204450 A1 | 10/2003 | Heinrichs et al. |
| 2004/0230503 A1* | 11/2004 | Lucas .............................. 705/28 |
| 2007/0162360 A1 | 7/2007 | Congram et al. |
| 2007/0174365 A1 | 7/2007 | Pruitt et al. |
| 2008/0077594 A1 | 3/2008 | Ota |
| 2008/0275791 A1 | 11/2008 | Youssef et al. |
| 2011/0251865 A1 | 10/2011 | Yuen et al. |

OTHER PUBLICATIONS

International Search Report and Written Opinion for International Application No. PCT/US2011/038324 dated Sep. 21, 2011.

International Preliminary Report on Patentability for Application No. PCT/Us2011/038363 dated Jan. 8, 2013.

* cited by examiner

Customer Commercial Airplanes

| Wichita Portal | Reporting Questions | Technical Questions | Seattle Portal | Log Off |

Acme Airplane Parts
Supplier Partners Information
Reports

216 — Supplier Common Resource

■ Wichita Applications
Electronic Accommodation Sales
Forms
M-Data Calendar
News & Info Archive
Supplier Communication Archive
ISSUE_43_FEBRUARY_2001.PDF
Tipsheets ■ Seattle Applications
MinMaxPilot ■ Links To Other Web-Sites
Doing Business
SPMS
TMX Web-Site

| File | Date |
|---|---|
| DeliveryDetail.mdb | 2/28/2001 7:33:25 AM |
| InventoryWorksheet.xls | 2/28/2001 8:03:42 AM |
| NB_757.ldb | 3/15/2001 10:16:23 AM |
| NB_757.mdb | 3/15/2001 10:15:40 AM |
| NB_777.mdb | 3/13/2001 4:18:22 PM |
| POP_PEForecast.mdb | 2/28/2001 8:33:30 AM |
| POSchedule.mdb | 3/15/2001 8:54:46 AM |
| RawForecast.mdb | 2/28/2001 8:33:32 AM |
| SupplierMetric.mdb | 2/28/2001 8:33:29 AM |

214

213 to Supplier

CURE MEMO FORM LETTER.DOC    3/13/2001 8:45:02 AM

212 to Customer Commercial Airplanes

File to send to supplier: [_________] [Browse...]

[Add File]

| Wichita Portal | Reporting Questions | Technical Questions | Seattle Portal | Log Off |

APPARATUS AND METHOD FOR CONTROLLING INVENTORY

CROSS-REFERENCE TO RELATED APPLICATIONS

The present application is a continuation-in-part of U.S. patent application Ser. No. 09/882,834, entitled: MIN/MAX INVENTORY CONTROL SYSTEM AND ASSOCIATED METHOD AND COMPUTER PROGRAM PRODUCT filed on Jun. 15, 2001; and claims priority from U.S. Provisional Patent Application No. 60/267,562, entitled: MIN/MAX INVENTORY CONTROL filed on Feb. 8, 2001, the content of both of which are incorporated herein by reference in their respective entireties.

FIELD OF THE INVENTION

The present invention relates to inventory control systems and methods and, more particularly, to lean inventory control systems and methods employing a minimum and a maximum inventory level.

BACKGROUND OF THE INVENTION

Everyday, businesses in product industries deal with inventory, generally consisting all of the goods and materials held by a business for future sale, use or other type of transfer. Typically, these businesses must engage in some type of inventory control to manage and maintain the proper amount of each good in stock or to provide the required service level of a product at a minimum cost. In one type of traditional inventory control system, a push system, an order for goods is issued for fulfillment in specified quantities, by specified due dates, based on estimated lead-times. In another type of traditional inventory control system, a pull (consumption based) system, an order is placed with the supplier when the on-hand inventory balance reaches a specified level.

These traditional methodologies of inventory procurement and management are generally transaction intensive, requiring many manual processes in order to keep customers supplied with the stock they need for future sale, use, or other type of transfer. Changes originating from engineering, define, and manufacturing result in a mismatch between the scheduled date and quantity, and the actual needed date and quantity. Due to changes in scheduling, engineering, and line stoppages, a mismatch often exists between the scheduled due date and/or the quantity, and the actual need date and quantity.

Administrative transactions, such as those entailing Change Orders and/or new Purchase Orders, adjust existing orders to account for these mismatches. New Purchase Orders may also be created to realign the needs of the customer with the inventory received from the supplier. While these administrative transactions seek to help control inventory and satisfy customer demand, the transactions themselves are expensive and wasteful in terms of resources. As an overhead cost, these transactions add no value to the end products of the customer.

In order to keep from running out of stock of a needed good and missing the delivery of a product incorporating the good to the customer as a result, it is common for suppliers to build excess inventory into their inventory control system to serve as a buffer to protect the supplier from being unable to deliver the required products. Additionally, the customer simultaneously orders and stores extra inventory to buffer the suppliers inability to consistently deliver the required products. This excess inventory is an economic liability for a number of reasons. First, excess inventory is costly for both the supplier and customer, as it ties up valuable, limited resources, such as space, materials, money, capacity, etc. Second, excess inventory exposes the manufacturer of the products to scrapage and rework in the event of a change in the configuration of a good. Third, excess inventory can pose a safety risk in terms of blocking aisles in storage areas or warehouses, as well as slowing down work flow, and reducing the efficiency at which the products can be produced and supplied.

Lean inventory systems, developed from lean manufacturing principles, can help address some of the problems associated with excess inventory and the waste created thereby. In lean inventory management systems, the emphasis is on real customer demand, which pulls products through the system, as they are needed. As such, lean inventory systems are a type of pull system. In traditional lean inventory systems, the time required to produce a particular good is matched as closely as possible with the rate of customer demand, thus, reducing excess inventory. Generally, the rate of customer demand is based upon projections, such as usage from a previous measured time period. But because the rate of customer demand can be more dynamic than a given projection, it is difficult, if not impossible, to always match production delivery dates and quantities with actual customer demand.

SUMMARY OF THE INVENTION

In light of the foregoing background, the present invention provides an improved lean inventory control system, method, and computer program product that employ a minimum and a maximum inventory level (min/max inventory) and a customer located warehouse. The system allows the supplier to monitor the customer's inventory levels and deliver needed products based on the customer consumption. By monitoring the inventory of the customer as the inventory changes, the supplier can better eliminate both the supplier and customer's wasteful excess inventory, and better match product supply with customer demand. Also, by providing additional products to the customer, based upon monitored inventory levels instead of schedule or separate Purchase Orders from the customer, expensive and wasteful administrative transactions are reduced. Additionally, the min/max inventory system allows the supplier to provide products to the customer from a warehouse as the customer's inventory level changes. Providing products to the customer from a warehouse near the customer's location reduces wasteful transportation time to better match product delivery with customer demand.

To facilitate communication between the supplier and the customer, the present invention also provides a system, method and computer program product for transferring at least one electronic file from a first location. The system for transferring electronic files improves the transfer of electronic files by providing a displayable reference electronic file including a pointer to the transferred electronic files. The displayable reference electronic file allows users to verify the location of a transferred file and, thereby access the transferred electronic file. Additionally, the reference electronic file can provide users with information relative to the date and/or time the electronic files were transferred. To facilitate the creation of composite electronic files which can further improve communication between the supplier and the customer, the present invention also provides a system, method and computer program product for generating composite electronic files, including pointers to one or more component electronic files. The system for creating composite electronic files allows originators of component electronic files to have their electronic files formatted and compiled into the composite electronic file without special training, and allows the composite electronic file to be updated each time it is accessed.

The min/max inventory system of the present invention typically operates in conjunction with a supplier/customer relationship whereby the supplier provides at least one product to the customer, who is often remote from the supplier. According to one embodiment of the present invention, the supplier and the customer have an open purchase order contract or agreement that includes a quantity of each product the supplier is to provide to the customer. The open purchase order contract or agreement also includes an acceptable inventory range bounded by a minimum and maximum amount for each product that the supplier provides to the customer that in order to defines delivery needs of the products to the customer. The system includes a processing unit disposed near the customer for storing a product inventory count associated with an initial amount of the products as the customer receives the initial amount. The customer's processing unit also maintains the product inventory count for each product representative of the amount of the product that is maintained in inventory. For example, the customer's processing unit can store the product inventory count in an electronic file, such as in a hypertext markup language (HTML) format or an extensible markup language (XML) format. The product inventory count is maintained by the customer's processing unit by decreasing the product inventory count as the customer sells, uses, transfers or otherwise ships out each product, and by increasing the product inventory count as the customer receives additional amounts of each product.

The system also includes a storage unit disposed remote from the supplier and proximate to the customer for storing a supply amount of the products provided to the customer. The products provided to the customer are drawn from the supply amount and, in one embodiment, the supply amount is bounded by the minimum and maximum amounts of the acceptable inventory range. Additionally, the system includes a processing unit disposed near the supplier for monitoring the product inventory count. For example, in embodiments where the customer's processing unit stores the product inventory count in an electronic file, the customer's processing unit may additionally be capable of transferring the electronic file to the supplier's processing unit, such as over the World Wide Web. The supplier's processing unit monitor's the product inventory count so that the supplier and/or the supplier's processing unit can detect product inventory counts that approach the respective lower limit, as evidenced by product inventory counts falling below a notification level between the upper and lower limits. When the supplier and/or supplier's processing unit detects that a product inventory count for a particular product is approaching the lower limit, supplier's processing unit can automatically send a shipment request to the supplier so that the supplier can provide the customer with an additional amount of the respective product. Because of the open purchase order, the supplier can provide the additional amount without a new purchase order associated with the additional amount, as long as the product inventory count is within the acceptable inventory range after the customer receives the additional amount. In one embodiment, the minimum amount is one below the maximum amount so that the supplier can provide the additional amount equal to the decrease in the product inventory count as the product inventory count decreases. Therefore, a constant product inventory count can be maintained by the supplier. Also, in this embodiment, the customer has at least one point-of-use location capable of receiving and shipping out each product. In this manner, the supplier can better match the delivery of the additional products with the customer demand by providing the products to the customer at the respective point-of-use location for the products. This simplifies receipt of the product and reduces the number of steps required for shipment of the required products.

In another embodiment, each product provided to the customer includes an electronic identifier for tracking the product. In this embodiment, the customer's processing unit can read each electronic identifier as the customer ships out the respective product and immediately thereafter decrease the product inventory count by the number of products shipped out as identified by the electronic identifiers. Additionally, the customer's processing unit can read each electronic identifier as the customer receives the respective product and immediately thereafter increase the product inventory count by the number of products received as identified by the electronic identifiers.

To facilitate communication between the supplier and the customer, the present invention also provides a system, method and computer program product for transferring at least one electronic file from a first location. The system includes a first processing unit, typically disposed at the customer location or otherwise under the control of the customer, on which the electronic files are stored. The first processing unit is capable of transferring the electronic files, such as by file transfer protocol (FTP), to a remote location, typically disposed at the supplier location or otherwise under the control of the supplier. After the first processing unit transfers the electronic files, the first processing unit generates at least one pointer, such as a hypertext link, associated with the transferred electronic files and the remote location. The first processing unit then generates a reference electronic file and thereafter includes the pointers in the reference electronic file. Additionally, in one embodiment the reference electronic file includes a date and/or time stamp identifying the date and/or time the electronic files were transferred from the first processing unit. The reference electronic file is capable of being displayed, such as an HTML or XML formatted electronic file. The system also includes a second processing unit disposed remote from the first processing unit, such as at the supplier location. Typically, the remote processing unit and the second processing unit are electrically connected, such as over a local area network (LAN). The second processing unit is capable displaying the reference electronic file, including the pointers, so that a user located proximate the second processing unit is capable of locating the electronic files at the remote location based upon the pointers. For example, by including pointers for the electronic files on a reference electronic file, the supplier can locate the electronic files, previously transferred from the customer, on a supplier accessible computer without additional notification from the customer as to the transfer. In one embodiment, the second processing unit displays the reference electronic file, including the pointers, for a predefined period of time. By displaying the reference electronic file, including the pointers, for a predefined period of time, the reference electronic file can be updated with removed or different pointers to take into account any change in file location, as well as any subsequent electronic file transfers to the second processing unit.

To further facilitate communication between the supplier and the customer, the present invention also provides a system, method and computer program product for generating at least one composite electronic file, such as an HTML or XML formatted electronic file. The system includes a first processing unit having at least one composite location capable of storing at least one component electronic file. The first processing unit may additionally be capable of receiving the component electronic files into the respective composite locations. In one embodiment, the system further includes a remote processing unit, such as a computer connected to the first processing unit over a LAN, having at least one composite location capable of storing, and possibly receiving, the component electronic files. In another embodiment, the first processing unit also includes a master electronic file, such as an HTML or XML formatted electronic file, having a composite pointer, such as a hypertext link, associated with each composite location so that each composite location is accessible via the respective composite pointer.

The first processing unit is capable of generating the composite electronic files when the respective composite locations are accessed from a second processing unit. The composite electronic files include at least one component pointer, such as a hypertext link, associated with the component electronic files in the respective composite locations. The composite electronic files are capable of being displayed through an interface, such as a graphical user interface (GUI), so that the information within component electronic files are accessible via the interface, based upon the component pointers. When a component electronic file is removed from the respective composite location, the first processing unit generates the respective composite electronic file without the component pointer associated with the respective component electronic file. Automatically generating the composite electronic files as the composite locations are accessed allows users at the customer location, for example, who may comprise users from multiple sectors within the customer's business, to create, delete and otherwise modify electronic files pertaining to their particular sector for display by the supplier.

The present invention therefore provides an improved lean inventory control system that employs minimum and maximum inventory levels and a customer located warehouse or point-of-use (POU) inventory. The min/max inventory system allows the supplier to monitor the inventory and to provide additional products to the customer as the customer's inventory changes. Monitoring the inventory of the customer as the inventory changes reduces wasteful excess inventory, and facilitates a better match between the production of products and customer demand for the products. Providing additional products to the customer, based upon monitored inventory levels instead of based upon a schedule or separate purchase orders from the customer, reduces expensive and wasteful administrative transactions. Also, the min/max inventory system of the present invention allows the supplier to provide products to the customer from a warehouse at or near the customer's location as the customer's inventory level changes, which reduces wasteful transportation time to better match product delivery with customer demand.

The present invention also provides a system, method and computer program product for transferring at least one electronic file from a first location. The system provides a displayable reference electronic file including a pointer to the transferred electronic files that allows users to verify the location of a transferred file and, thereby, access the transferred electronic file. The present invention further includes a system for creating composite electronic files that allows originators of component electronic files to have their electronic files formatted and compiled into the composite electronic file without special training.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
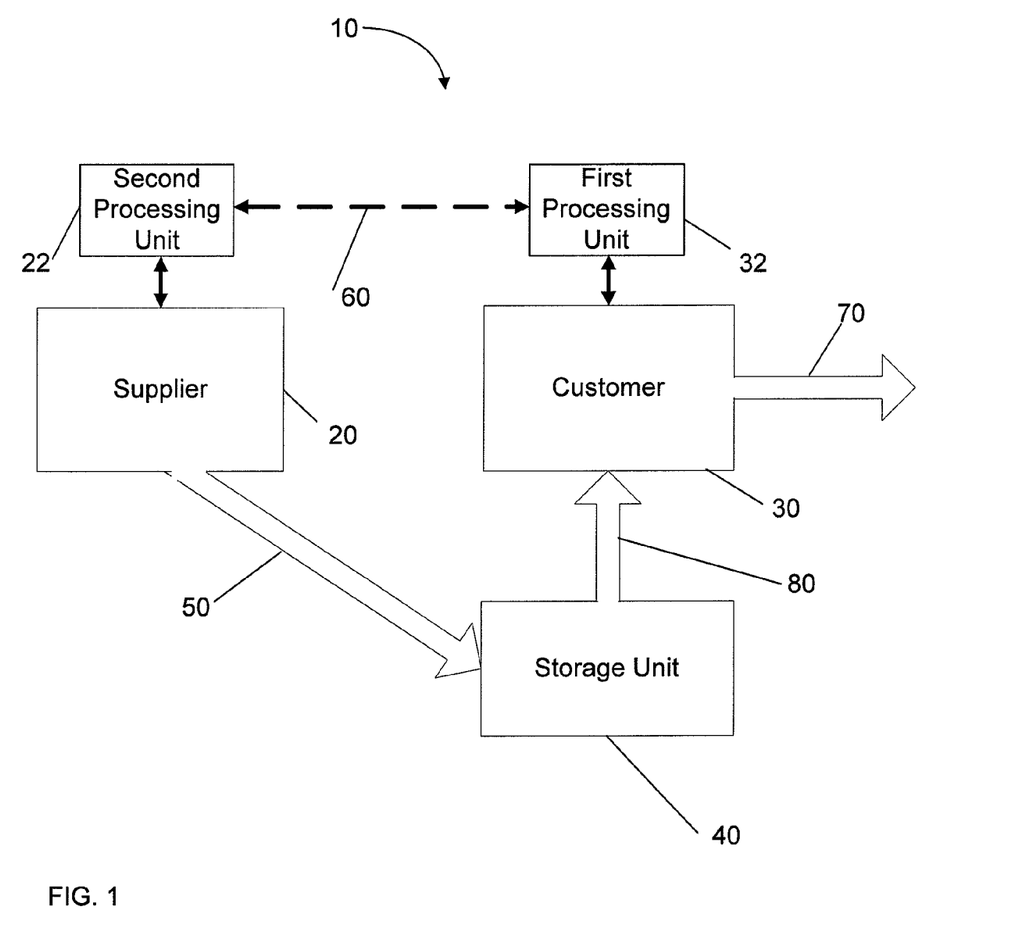
FIG. 1 is a block diagram of the system for providing at least one product from a supplier to a customer according to one embodiment of the present invention.

FIG. 1 illustrates a system 10 for providing at least one product from a supplier 20 to at least one customer 30 according to one embodiment of the present invention. The supplier provides the products to the customer and, in turn, the customer receives and thereafter ships out the products, such as by selling, using or transferring the products to third parties. To track the customer's inventory of products provided by the supplier, the system includes a first processing unit 32, such as a personal computer or other high level processor, preferably under the control of the customer. To monitor the customer's inventory of products provided by the supplier, the system also includes a second processing unit 22, such as a personal computer or other high level processor, preferably under the control of the supplier and disposed remote from the first processing unit. Additionally, to reduce transportation time and facilitate matching delivery of the products with customer demand, the system preferably includes a storage unit 40, such as a warehouse under the supplier's control, for storing a supply amount of the products that are thereafter provided to the customer. In a preferred embodiment, the supplier is remote from the customer and the storage unit, and the storage unit is proximate the customer. As such, the time required to deliver products from the storage unit to the customer is thereby decreased relative to deliveries from the supplier's location.

Figure 2:
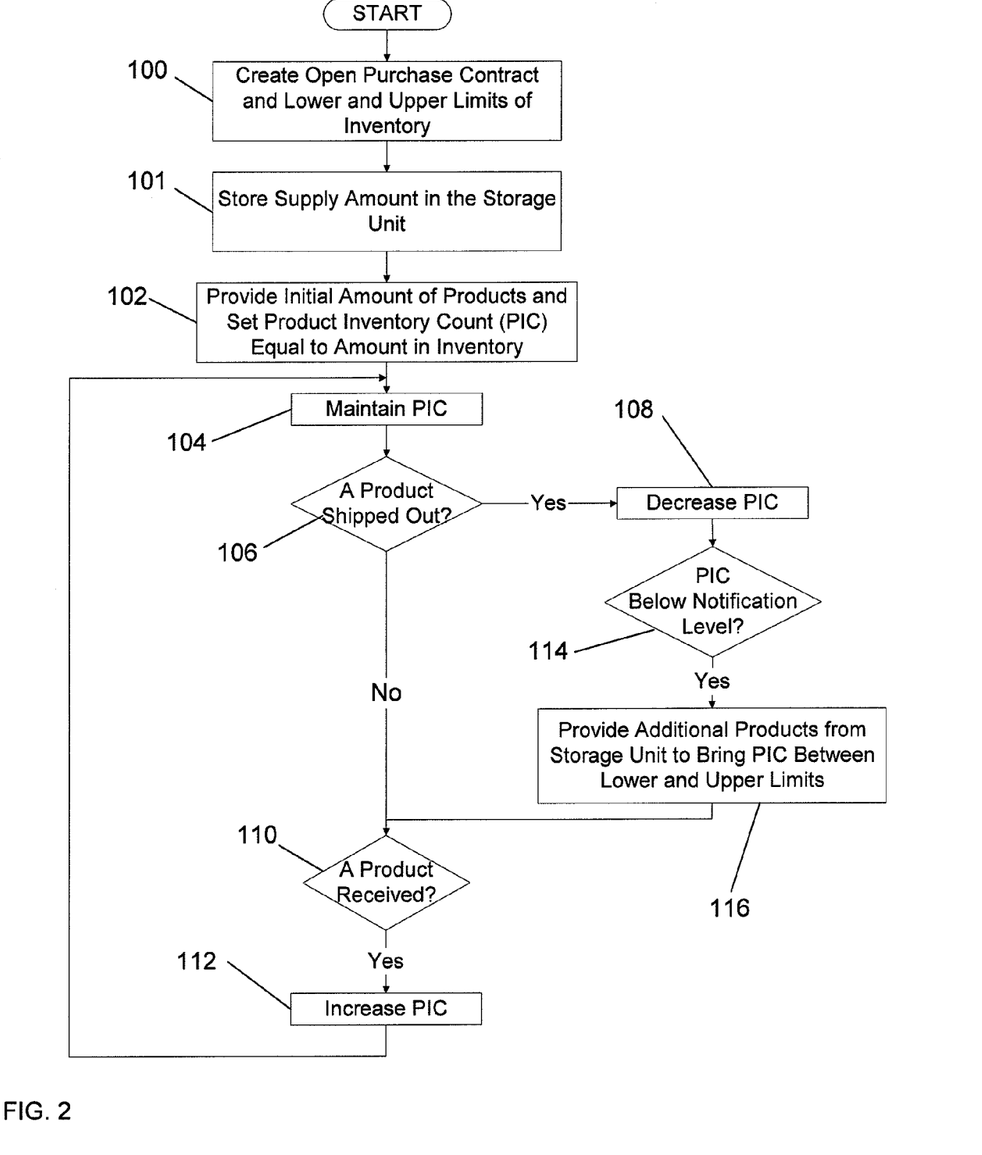
FIG. 2 is a flow diagram of the operations performed to manage an inventory of at least one product of a supplier that is provided to a customer according to one embodiment.

As shown in FIG. 2, the supplier and each customer have an open purchase order for the products provided to the customer by the supplier (block 100). The open purchase order is typically a contract including any number of different contract terms as agreed to by the supplier and the customer. But instead of providing multiple purchase orders for a specific quantity of each product and a schedule of delivery date or dates, an open purchase order is created that includes a total quantity of products the supplier is to provide to the customer for a contracted period of time. Additionally, the open purchase order includes an acceptable inventory range bounded by a lower (i.e., minimum) and an upper (i.e., maximum) limit for each product, which governs delivered quantities of the product provided to the customer. Typically, the acceptable inventory range is agreed upon and shared between the supplier and customer. The minimum quantity typically represents an amount of inventory required to cover the supplier in areas such as, for example, replenishment lead time, yield factor, packaging requirements and lot sizing requirements. And the maximum quantity typically represents an amount of inventory taking into account the customer's needs in areas such as, for example, consumption, forecast accuracy, yield factor, lot-sizing requirements and inventory turn rate requirements. Delivery times can be specified in a number of manners such as, for example, a specified number of days after the inventory is decreased by a predetermined amount.

After the terms of the open purchase order have been completed, in one embodiment, the supplier 20 stores a supply amount 50 of each product supplied to the customer 30 in the storage unit 40 (block 101). While the supply amount can be any amount above the lower limit specified in the open purchase order, in a preferred embodiment the supply amount is bounded by the lower and upper limits of the open purchase order.

The supplier then initiates a method of managing the inventory of the customer by providing the customer with an initial amount of each product (block 102). As the customer receives the products 80, the first processing unit 32 stores a product inventory count representative of the initial amount of each product received by the customer. Whereas the product inventory count can be stored in any number of different manners, the product inventory count is preferably stored in an electronic file, such as in a hypertext markup language (HTML) format or an extensible markup language (XML) format. The description herein of the systems and methods of providing the products to the customer and managing the inventory of the customer are premised on the customer not already having an inventory of the products when the supplier provides the initial amount. It should be understood, however, that the customer can already have an amount of the products in inventory when the supplier provides the initial amount of the products. In such an instance, the product inventory count would be representative of the sum total of the initial amount of each product received by the customer and the amount of the respective product in the customer's inventory when the customer receives the initial amount.

In one embodiment, each product can include an electronic identifier, such as a radio frequency identification (RFID) tag (not shown). The electronic identifier can be located in any of a number of different locations relative to the respective product, such as on the product itself or on the product's packaging. In this embodiment, the first processing unit 32 reads each electronic identifier as the customer 30 receives the respective product 80 from the storage unit 40. As the first processing unit reads the electronic identifiers, the first processing unit increases the product inventory count by the number of products received as identified by the electronic identifiers. After the customer 30 receives the initial amount of each product, the first processing unit maintains the product inventory count (block 104). As the customer ships out each product 70, the first processing unit 32 decreases the product inventory count by the number of products shipped out (blocks 106 and 108). And as the customer receives additional quantities of each product 80, just as with the initial amount of products, the first processing unit increases the product inventory count by the number of products received (blocks 110 and 112). In embodiments including the electronic identifiers, the first processing unit reads each electronic identifier as the customer ships out the respective product and immediately thereafter decreases the product inventory count by the number of products shipped out as identified by the electronic identifiers. When the customer receives the respective product from the storage unit, the first processing unit reads each electronic identifier and immediately thereafter increases the product inventory count by the number of products received as identified by the electronic identifiers.

As the first processing unit 32 maintains the product inventory count, the second processing unit 22 and/or the supplier 20 monitors the product inventory count at a location remote from the customer. The second processing unit is typically disposed at a supplier location or is otherwise controller by the supplier. To monitor the product inventory count, in embodiments wherein the first processing unit stores the product inventory count in an electronic file, for example, the first processing unit can transmit the electronic file to the second processing unit, such as via the World Wide Web. In this manner, the second processing unit and/or the supplier can monitor the product inventory count, electronically or through a display of the electronic file, as the product inventory count changes. When the product inventory count falls below a notification level, the second processing unit and/or the supplier can detect the inventory of the customer 30 as approaching the lower limit of acceptable inventory (block 114). The notification level, which is between the upper and lower limits, acts as a buffer to insure that additional products are provided to the customer before the product inventory count falls below the lower limit. In this regard, the notification level can be based on any of a number of different factors, such as the rate at which the customer typically ships out the products and the time required to transport the products to the customer.

When the second processing unit 22 and/or the supplier 20 detect a product inventory count approaching the lower limit of acceptable of inventory, the second processing unit can send a shipment request to the supplier so that the supplier can provide the customer 30 with an additional amount of the respective product to keep the customer's inventory within the acceptable inventory range (block 116). As the customer receives the additional products, the first processing unit 32 continues to maintain the product inventory count by increasing the product inventory count accordingly. Because the additional products are provided pursuant to the open purchase order and the customer's current inventory level, the supplier can provide the additional products without a separate purchase order from the customer. In this manner, the expensive and wasteful administrative transactions of conventional inventory control systems are reduced.

In one embodiment, to maximize the reduction of wasteful supplier inventory, the lower limit of the acceptable inventory range is one below the upper limit. In this embodiment, the supplier 20 provides the products to the customer 30 at a predefined frequency that is sensitive to the consumption of the product, such as providing products daily to the customer based on daily consumption of the products. In this regard, the receiving of additional products more closely matches customer demand. In this manner, as the customer ships out a product 70, the first processing unit 32 decreases the product inventory count. The second processing unit 22 and/or the supplier detect the decrease in the product inventory count, and thereafter the supplier provides the customer with the additional amount of the product to increase the product inventory count by the amount of the product previously shipped out. Providing the customer with the additional amount as the product inventory level decreases allows the supplier to provide the customer with products with a stable and regular demand schedule while lowering the supplier's inventory. In operation, for example, assume the lower limit is one below the upper limit for a given product, assume the current inventory level for the product is two, and assume the customer ships out two units of the product on a given day. The following day (or other delivery time as provided for in the open purchase order), the supplier provides the customer with two units of the product to bring the product inventory count back up to two, which is greater than the lower limit, and equal to the upper limit.

In this embodiment, to further match receiving the products with customer 30 demand, the customer has at least one point-of-use location where the customer uses the products (not shown). As the customer ships out each product from its respective point-of-use location, the supplier 20 provides the additional products to the customer at the respective point of use location, as opposed to a single designated receiving location. This reduces the wasteful delivery time as the customer is not required to ship the products from the customer-designated receiving location to the respective point-of-use location for the product.

Figure 3A:
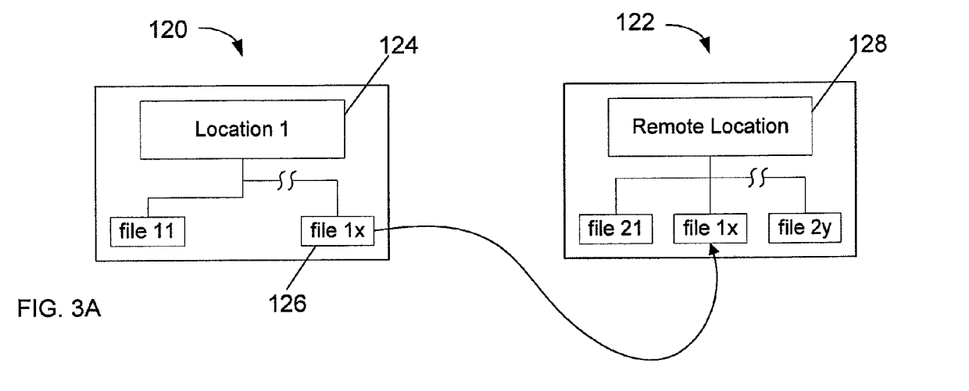
FIGS. 3A-3C illustrate some of the operations for transferring at least one electronic file from a first location according to one embodiment of the present invention.

Referring now to FIGS. 3A-3C and 4, to facilitate communication between the supplier 20 and the customer 30, the present invention also provides a system, method and computer program product for transferring at least one electronic file 126 from a first location 124, such as from a memory device at the customer location or otherwise under the control of the customer. According to one embodiment, the system includes a first processing unit 120, such as a personal computer or other high level processor, including a memory device having the first location 124 for storing the electronic file to be transferred. The system also includes a remote processing unit 122, such as a personal computer or other high level processor, disposed remote from the first processing unit, such as at a supplier location or otherwise under the control of the supplier, and including a memory device having a remote location 128 for receiving the electronic file. The remote location may require a user to have and supply particular credentials to access the location and any included electronic files, or the memory device may include multiple remote locations one or more of which may require such access credentials. In operation, the electronic file to be transferred is selected (block 150). Then, as illustrated in FIG. 3A, the first processing unit transfers the electronic file to the remote location in the remote processing unit (block 152). The first processing unit can transfer the electronic file by any method known to those skilled in the art, but in one embodiment the first processing unit transfers the electronic file via a protocol, such as a file transfer protocol (FTP), a hyper text transfer protocol (HTML), or a secured HTML (HTTPS). It should also be understood that the transfer may be by an upload or push from the first processing unit to the remote location, or may be by a download or pull from the remote processing unit to the remote location.

Figure 3B:
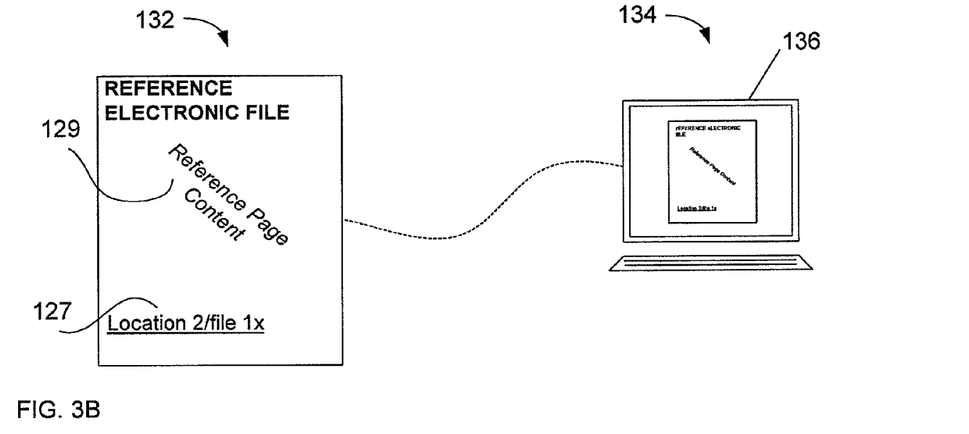
Figure 4:
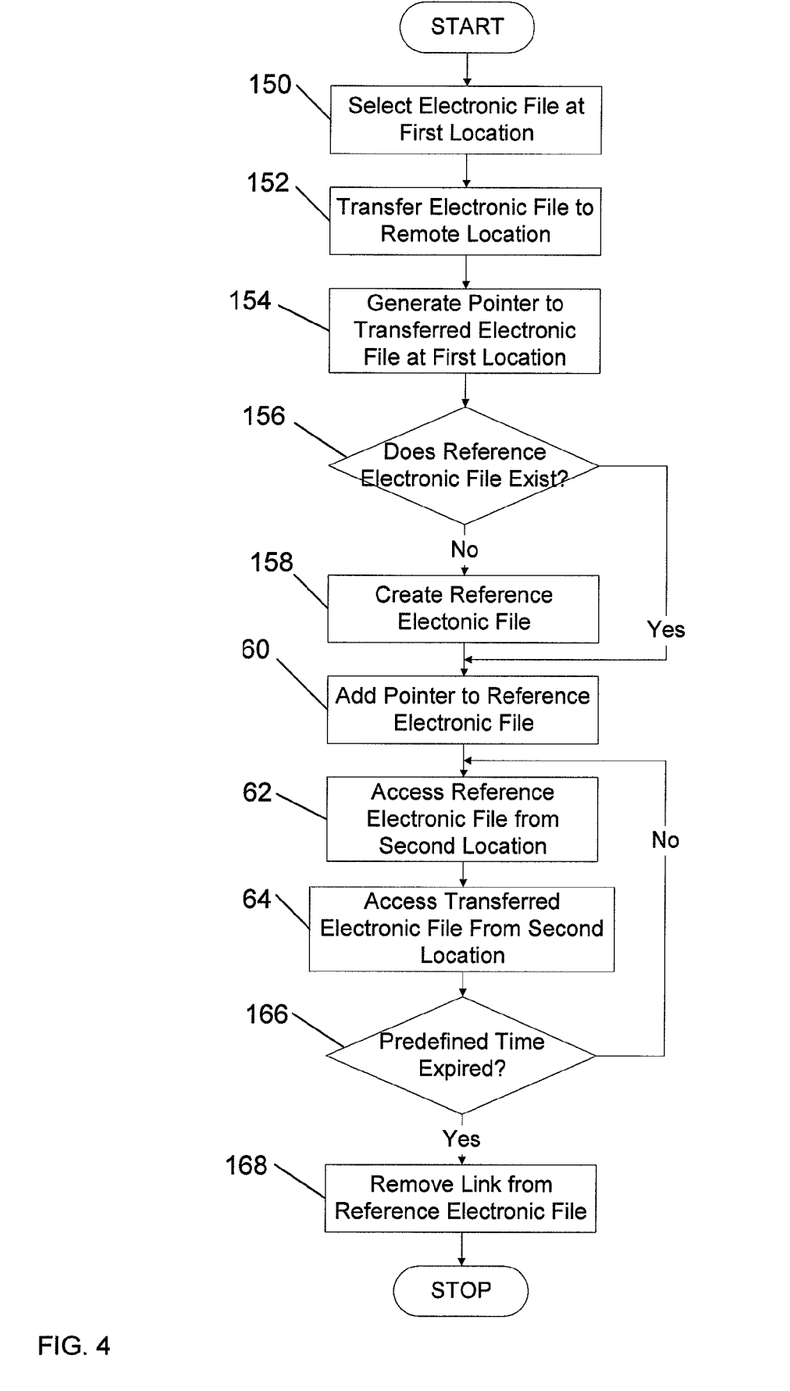
FIG. 4 is a flow diagram of the operations for transferring the electronic file from the first location according to one embodiment.

After the first processing unit 120 transfers the electronic file 126, the first processing unit generates a pointer 127, such as a hypertext link, associated with the electronic file and the remote location 128 (block 154). As shown in FIG. 3B, if the first processing unit does not already have a reference electronic file 132, the first processing unit next generates the reference electronic file, such as an HTML, XML, active server pages (ASP) or ASP.NET formatted file (blocks 156 and 158). The first processing unit includes the pointer in the reference electronic file and may additionally include other information 129, such as information relative to the contents of the electronic file. Additionally, the reference electronic file may include a date and/or time stamp for each transferred electronic file that identifies the date and/or time the electronic file was transferred.

The pointer 127 may be identified in the reference electronic file 132 in any of a number of different manners, including textual and/or graphic manners. For example, the pointer may be identified by the name of its associated electronic file 126. Alternatively, for example, the pointer may be identified by one or more pieces of textual information associated with the associated electronic file, such as information stored in a properties dialog of the file, in metadata stored with the file, or the like. Regardless of any textual identifier that the pointer may have, however, the pointer may additionally or alternatively include a graphical identifier, such as an icon. In such instances, the icon may be selected in a number of different manners, such as based on a filename extension of the associated electronic file.

Figure 3C:
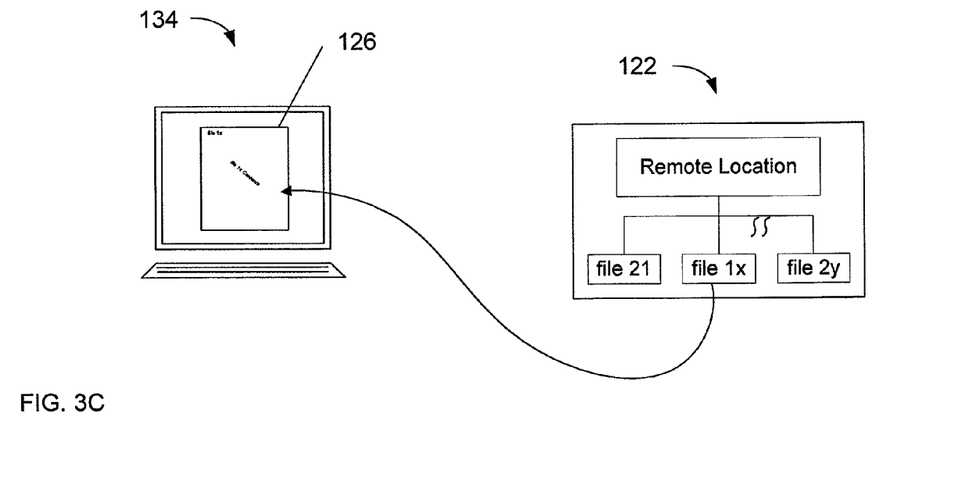

As illustrated in FIG. 3B, after the pointer 127 has been included in the reference electronic file 132, the reference electronic file can be copied by, transferred to or otherwise accessed by, and displayed by a display 136 associated with a second processing unit 134 (block 162). For example, the reference electronic file can be downloaded via FTP from the World Wide Web from the first processing unit 120 to the second processing unit and thereafter displayed by the second processing unit. Using the pointer on the display of the reference electronic file, a user of the second processing unit can locate and/or access the transferred electronic file 126 from the remote location 128, as shown in FIG. 3C (block 162). Like the remote processing unit, the second processing unit is also typically located at the supplier location or otherwise under the control of the supplier. For example, the remote processing unit and the second processing unit can be connected, such as over a LAN. Whereas the remote processing unit and second processing unit are illustrated as separate components, it should be understood that the second processing unit can be the remote processing unit, including the remote location. In such an embodiment, a user of the remote processing unit could view a display of the reference electronic file and, based upon the pointer, access the transferred electronic file stored in the remote location. Whereas, the system, method and computer program product of transferring the electronic files facilitates communication between the supplier and the customer, it should be understood that the system, method and computer program product can be employed in other contexts as well, without departing from the spirit and scope of the present invention.

In various instances, the first and/or remote processing units 120, 122 may be configured to maintain one or more predefined electronic files at the remote location 128, and at various instances when one of the predefined electronic files is not found at the remote location, may be configured to push or pull the respective electronic file to the remote location. Additionally or alternatively, the first and/or remote processing units may be configured to maintain the predefined electronic files at the remote location up-to-date. In such instances, the first and/or remote processing units may be configured to check the predefined electronic files at the remote location periodically or on-demand to determine if any of the respective electronic files have been stored at the remote location for more than a predefined period of time. And when an electronic file has been stored at the remote location for more than the predefined period of time, the first and/or remote processing units may be configured to push or pull another (presumably more up-to-date) copy of the respective electronic file to the remote location to replace the copy already at the remote location.

Because a user of the first processing unit 120 may want the contents 129 of the reference electronic file 132 to be accessible for a longer time period than the transferred electronic file 126, the first processing unit may only include the pointer 127 in the reference electronic file for a predefined period of time (the same as or different from a predefined period of time for the electronic files). After the predefined period of time has expired, the first processing unit may purge the reference electronic file of the pointer to thereby update the reference electronic file (blocks 166 and 168). Removing the pointer allows the reference electronic file to be updated with pointers removed and/or added to take into account transferred electronic files no longer located in the remote location into which they were transferred, and to take into account subsequent electronic files transferred to the same or different remote locations.

The reference electronic file 132 may be a file (e.g., HTML, XML formatted file) generated to include pointer(s) 127 and any other information 129 that may be removed from and/or added to the electronic file at various instances to keep the file up-to-date. Alternatively, the reference electronic file may be a dynamically-generated file (e.g., ASP, ASP.NET formatted file) generated and regenerated at various instances to include current pointer(s) and any other information, thereby keeping the file up-to-date.

When the reference electronic file 132 is a dynamically-generated file, the instances in which the file is regenerated may be predefined in a number of different manners, and the pointer(s) 127 and other information 129 included in the file in each instance may be selected in any of a number of different manners. For example, the reference electronic file may be regenerated periodically or on-demand, such as at one or more instances in which the user of the second processing unit 134 accesses the reference electronic file. In this regard, the reference electronic file may be generated to include pointer(s) for electronic file(s) 126 currently at the remote location 128 at the time. Additionally or alternatively, in instances in which predefined electronic file(s) are to be maintained at the remote location, the electronic file(s) currently at the remote location may be compared to the predefined electronic file(s). By this comparison, any of the predefined electronic files missing from the remote location, and/or any of present predefined electronic files that have been at the remote location for more than a predefined period of time, may be identified. These electronic files or other copies of these electronic files may then be pushed or pulled to the remote location before pointers for files at the remote location are generated, and the reference electronic file is generated.

Figure 5:
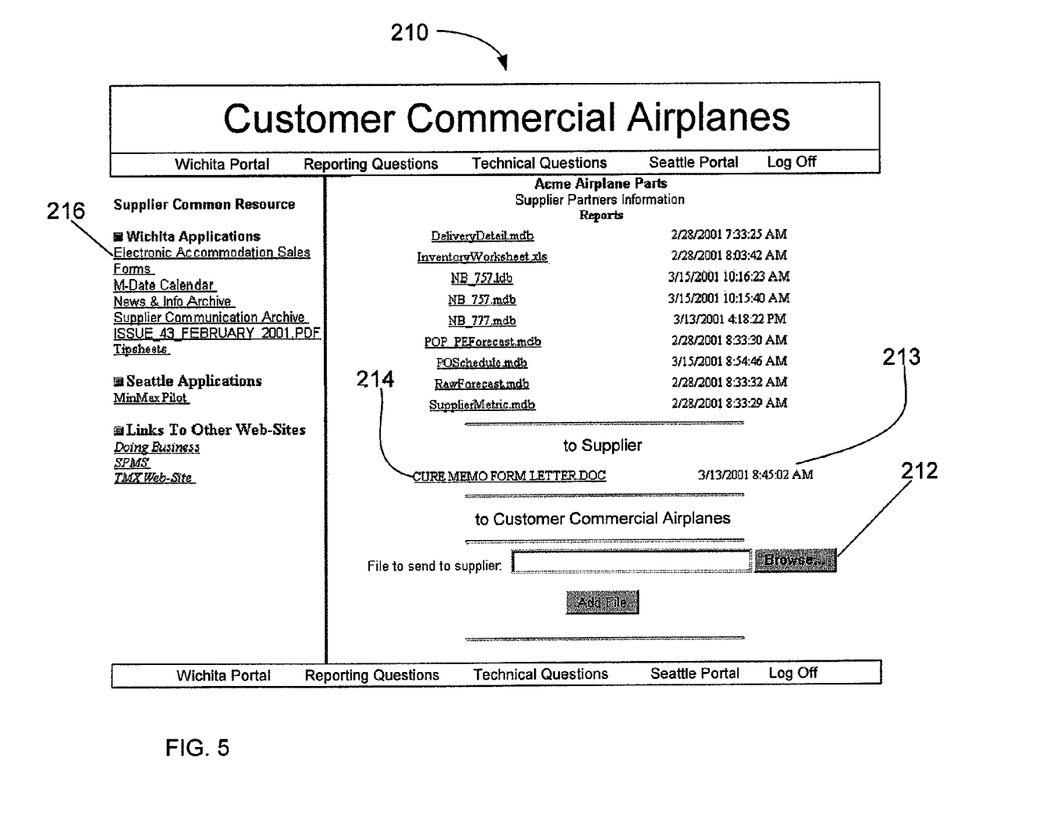
FIG. 5 is a schematic diagram of the reference electronic file including an electronic file transferred according to one embodiment of the method for transferring the electronic file.

FIG. 5 illustrates an example of the reference electronic file including an electronic file transferred according to one embodiment of the method for transferring the electronic file. Transferring the electronic file from the first processing unit, such as at the customer location, to the second location, such as the supplier location, allows the supplier to receive electronic files from the customer to thereafter locate and access without additional notification from the customer. Referring to FIG. 5, the customer can select electronic files, such as inventory reports, using a file select interface 212 and transfer the electronic files to the supplier location. After the customer has transferred the electronic files, a hypertext link, and possibly a date/time stamp 213, can then be generated for the transferred electronic files 214 on a reference page 210, such as a supplier information page that may additionally include hypertext links to additional miscellaneous information 216. In this manner, any person with access to the reference page can locate and access the transferred electronic files without additional notification as to the transfer, such as an email notifying the supplier of the transferred electronic file or its location. As previously stated, the system, method and computer program product of transferring the electronic files facilitates communication between the supplier and the customer. But it should be understood that the system, method and computer program product can be employed in other contexts as well, without departing from the spirit and scope of the present invention.

To further facilitate communication between the supplier 20 and the customer 30, the present invention provides a system, method and computer program product for creating at least one composite electronic file. Referring to FIGS. 6 and 7A-7C, one embodiment of the system includes a first processing unit 172, such as a personal computer or other high level processor, comprising a memory device having at least one composite location 176. The first processing unit is capable of storing at least one component electronic file 178, such as HTML or XML formatted electronic files, into the at least one composite location. The first processing may also be capable of receiving the component electronic files and thereafter storing the received component electronic files in the respective composite locations. In one embodiment, the system also includes a remote processing unit (not shown), such as a personal computer or other high level processor, comprising a memory device having at least one composite location. For example, the remote processing unit can be a personal computer in communication with the first processing unit over a local area network. Like the first processing unit, the remote processing unit is capable of storing the at least one component electronic file, and can be capable of receiving the component electronic files and thereafter storing the received component electronic files on the composite locations.

Figure 6:
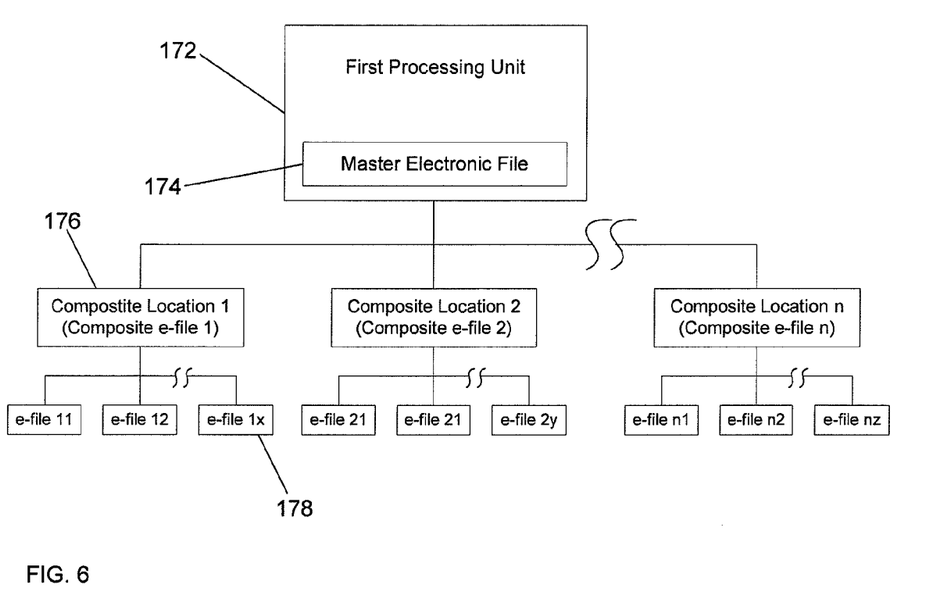
FIG. 6 is a schematic diagram illustrating a file structure for storing component electronic files in accordance with the system for generating at least one composite electronic file according to one embodiment.

The system also includes a second processing unit 184 capable of accessing the composite locations 176 and the component electronic files 178 stored therein. In one embodiment, the first processing unit 172 includes a master electronic file 174, such as an HTML or XML formatted electronic file, within the first processing unit. The master electronic file includes at least one composite pointer 182, such as a hypertext link, associated with the at least one composite location. In this embodiment, a user of the second processing unit can access the composite locations via the at least one composite pointer since the second processing unit has access to the master electronic file.

Figure 8:
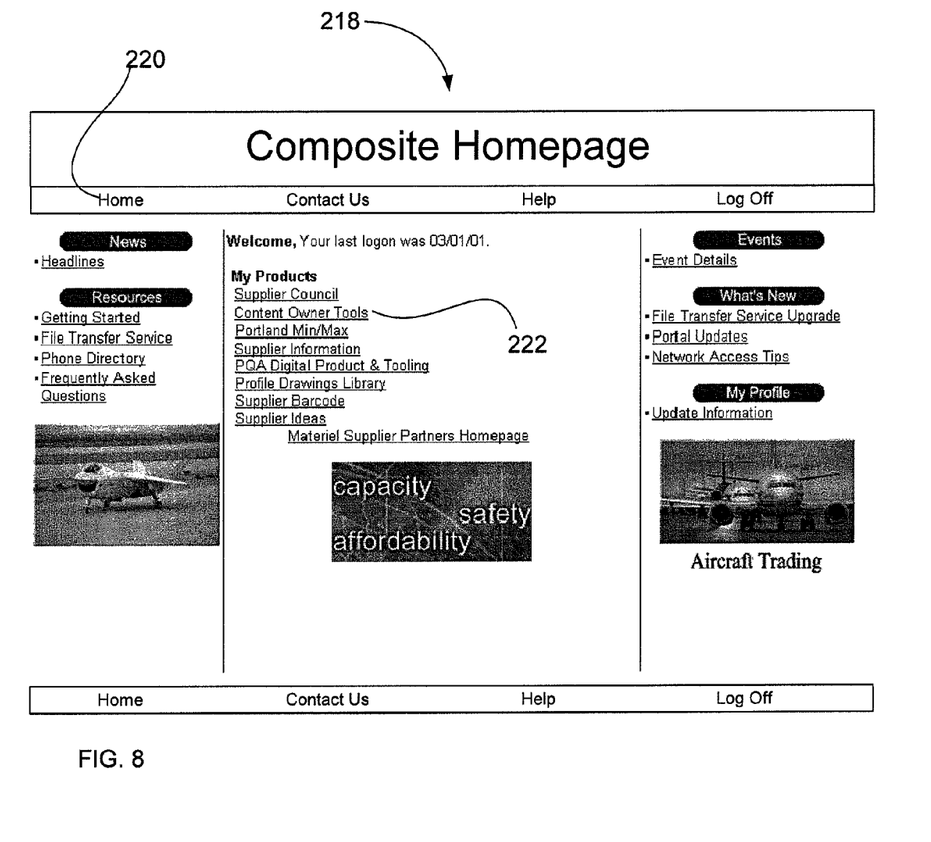
FIG. 8 is a schematic diagram of a composite electronic file generated according to one embodiment of the method for generating the composite electronic file.

FIG. 8 is an example composite electronic file generated from the customer location according to one embodiment of the method for generating the composite electronic file. Automatically generating each composite electronic file 218 as the composite locations are accessed allows users at the customer location who may comprise users from multiple sectors within the customer's operation, to create, delete and otherwise modify electronic files pertaining to their particular sector for display by the supplier. In this regard, the component pointers 222 allow the component electronic files to be accessed from one composite electronic file as opposed to requiring the location of each component electronic file to be known. The customer can additionally have a master electronic file, such as a supplier information electronic file, that the supplier can access to access constantly updated composite electronic files and, in turn, component electronic files, such as information relative to the supplier and/or different areas of the customer's business, such as different product lines, different manufacturing areas or different point-of-use locations. In this regard, each composite electronic file can additionally include a master pointer 220, such as a hypertext link, to the master electronic file. Whereas, the system, method and computer program product for creating the composite electronic files further facilitates communication between the supplier and the customer, it should be understood that the system, method and computer program product can be employed in other contexts as well, without departing from the spirit and scope of the present invention.

Figure 7A:
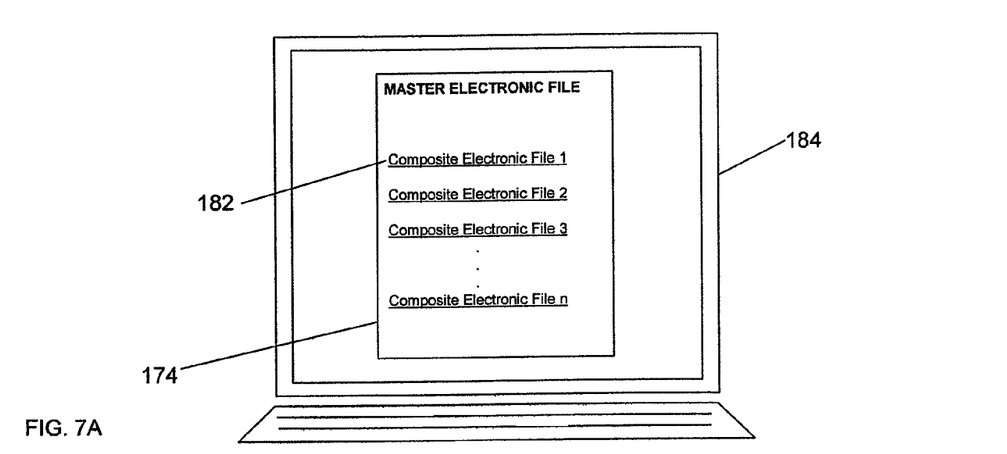
FIGS. 7A-7C illustrates some of the various electronic files used in one embodiment of the method for generating the composite electronic file.
Figure 9:
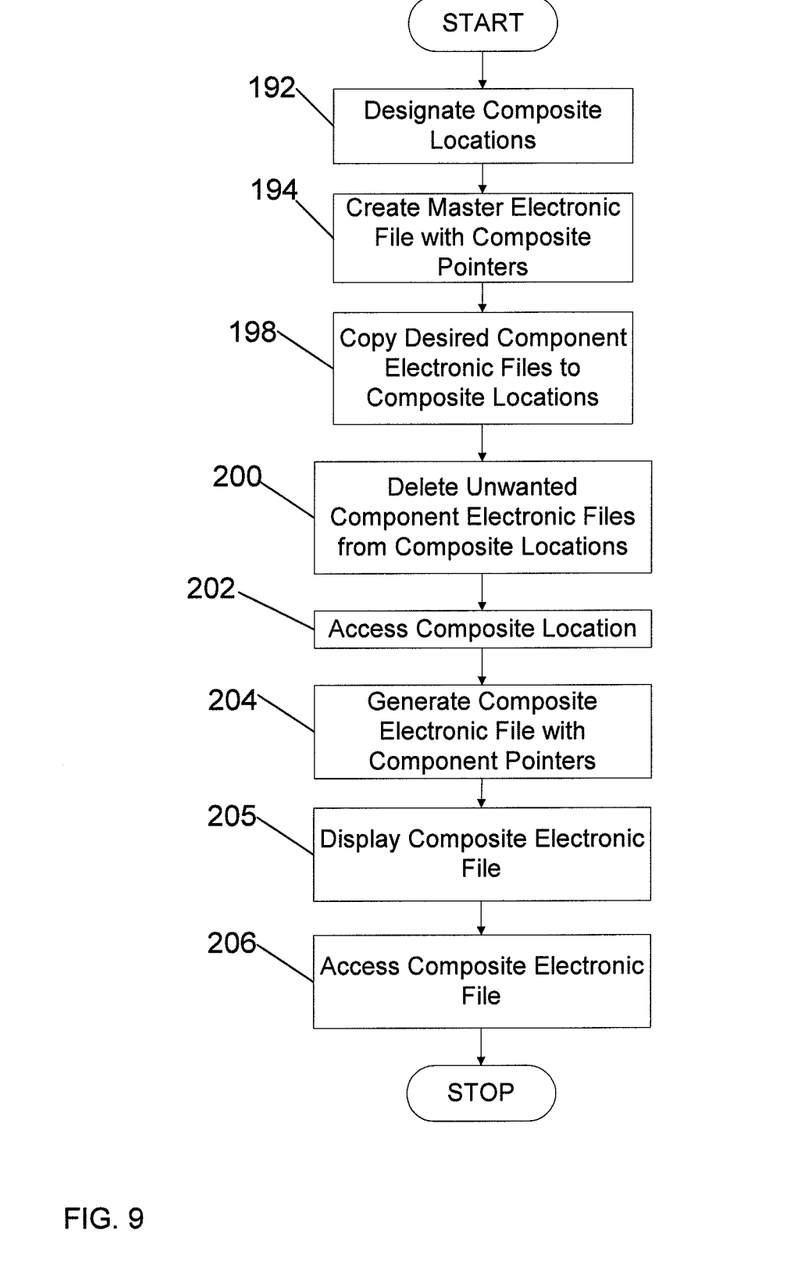
FIG. 9 is a flow diagram of the operations for generating the composite electronic file according to one embodiment of the present invention.

Referring to FIG. 9, in operation, the composite locations 176 in the first processing unit 172, and possibly the remote processing unit, are designated (block 192). In embodiments including a master electronic file 174, the master electronic file is created by the first processing unit, and includes the composite pointers 182, as shown in FIG. 7A. For example, a server computer located at the customer location or otherwise under the control of the customer, can include the master electronic file, such as a supplier web page, with pointers, such as hypertext links, to the component locations, such as memory locations on the server computer or on the remote processing unit, such as a computer connected to the server computer over a LAN. The component electronic files 178 are then copied into and/or removed from respective composite locations (blocks 198 and 200). Then, from the second processing unit 184, the composite locations are accessed, such as via the composite pointers in the master electronic file to which the second processing unit has access (block 202).

Figure 7B:
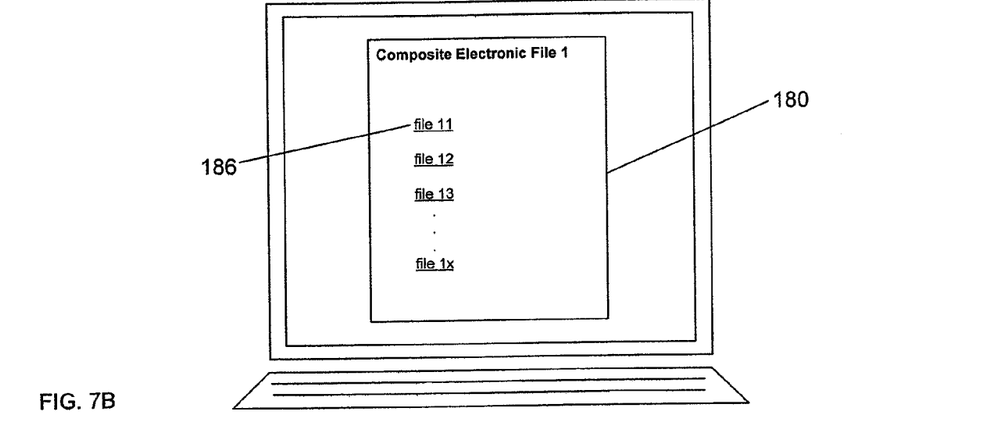
Figure 7C:
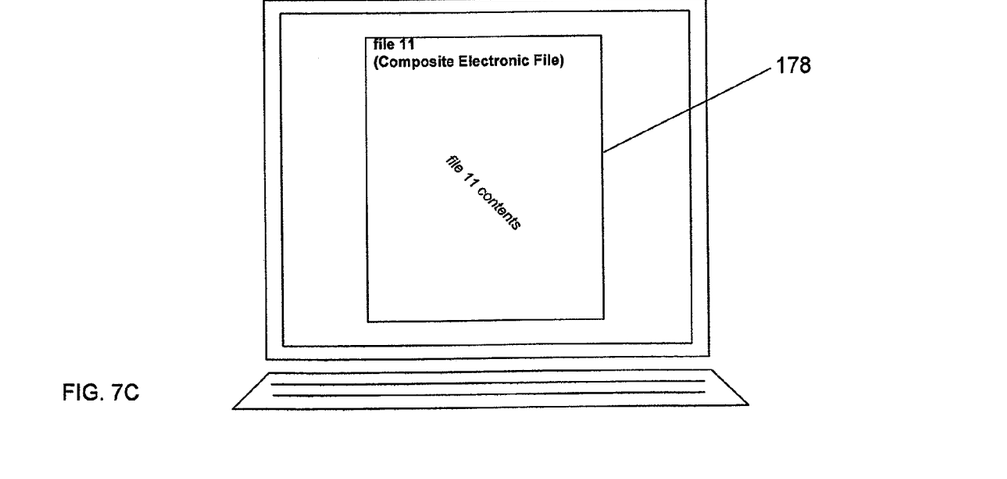

When the second processing unit 184, such as a personal computer located at the supplier location or otherwise under the control of the supplier, accesses the composite locations 176, the first processing unit 172 automatically generates the respective composite electronic file 180, such as in HTML or XML format, as shown in FIG. 7B (block 204). The composite electronic file includes at least one component pointer 186, such as a hypertext link, associated with the at least one component electronic file 178 stored in the respective composite location. If one or more of the component electronic files are subsequently removed from the respective composite location, when the second processing unit thereafter accesses the respective composite location, the first processing unit will generate the composite electronic file without the respective component pointers associated with the removed component electronic file or files. After the composite electronic file is generated, the composite electronic file is displayed on a graphical user interface (GUI), such as a display associated with the second processing unit (block 205). In this manner, the user can locate and access the respective component electronic files via the component pointers (block 206). As previously stated, the system, method and computer program product for creating the composite electronic files further facilitates communication between the supplier and the customer. It should be understood that the system, method and computer program product can be employed in other contexts as well, without departing from the spirit and scope of the present invention.

The present invention provides a lean inventory control system that employs min/max inventory levels and a customer located warehouse, and includes associated methods for transferring at least one electronic file and for generating at least one composite electronic file. The present invention allows the supplier to monitor the inventory to and provide additional products to the customer as the customer's inventory changes. Also, the min/max inventory system of the present invention allows the supplier to provide products to the customer from a warehouse near the customer's location as the customer's inventory level changes, which reduces wasteful transportation time to better match product delivery with customer demand.

The present invention also provides a system, method and computer program product for transferring at least one electronic file from a first location. The system allows users to verify the location of a transferred file and, thereby, access the transferred electronic file. The present invention further includes a system, method and computer program product for creating composite electronic files to allow originators of component electronic files to have their electronic files formatted and compiled into the composite electronic file without special training. These additional systems, methods and computer program products not only facilitate communication in the supplier/customer context, as described above, but can also be employed in other situations, if so desired.

In various advantageous embodiments, portions of the system and method of the present invention include a computer program product. The computer program product includes a computer-readable storage medium, such as the non-volatile storage medium, and computer-readable program code portions, such as a series of computer instructions, embodied in the computer-readable storage medium. Typically, the computer program is stored and executed by a processing unit or a related memory device, such as the first processing unit 120 as depicted in FIG. 3A or the first processing unit 172 as depicted in FIG. 6.

In this regard, FIGS. 1-9 are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
a processor disposed proximate a supplier of a system for providing a product from the supplier to a remote customer pursuant to an open purchase order that includes a total quantity of products the supplier is to provide to the customer for a contracted period of time, wherein the open purchase order between the supplier and the customer defines an acceptable inventory range bounded by a lower and an upper limit for units of the product that the supplier provides to the customer,
wherein the system includes a processing unit disposed proximate the customer and configured to maintain a product inventory count for the product representative of a number of units of the product that is maintained in inventory by the customer, the processing unit being configured to decrease the product inventory count as the customer ships out a unit of the product, and increase the product inventory count as the customer receives an additional unit of the product,
wherein the processor is configured to monitor the product inventory count and detect the product inventory count approaching the lower limit, the product inventory count approaching the respective lower limit when the product inventory count falls below a notification level greater than the lower limit and between the lower limit and the upper limit, and
wherein the processor is further configured to generate a shipment request to the supplier when the processor has detected the product inventory count approaching the lower limit, the processor being configured to generate the shipment request to facilitate the supplier providing the customer with one or more additional units of the product pursuant to the open purchase order and independent of a separate purchase order from the customer directed to the one or more additional units.

2. An apparatus according to claim 1, wherein the product inventory count is increased to within the acceptable inventory range once the customer receives the one or more additional units.

3. An apparatus according to claim 2, wherein the product inventory count is increased to within the acceptable inventory range but is less than the upper limit once the customer receives the one or more additional units.

4. An apparatus according to claim 1, wherein the processor being configured to monitor the product inventory includes being configured to receive, from the processing unit, an electronic file including the product inventory count, and includes being configured to monitor the product inventory count from the electronic file.

5. An apparatus according to claim 1, wherein the lower limit is one unit below the upper limit.

6. An apparatus comprising:
a processor disposed proximate a customer of a system for providing a product from a remote supplier to the customer pursuant to an open purchase order that includes a total quantity of products the supplier is to provide to the customer for a contracted period of time, wherein the open purchase order between the supplier and the customer defines an acceptable inventory range bounded by a lower and an upper limit for units of the product that the supplier provides to the customer,
wherein the processor is configured to maintain a product inventory count for the product representative of a number of units of the product that is maintained in inventory by the customer, the processor being configured to decrease the product inventory count as the customer ships out a unit of the product, and increase the product inventory count as the customer receives an additional unit of the product,
wherein the system further includes a processing unit disposed proximate the supplier and configured to monitor the product inventory count and detect the product inventory count approaching the lower limit,
wherein the processor is configured to send the product inventory count to the processing unit to enable the processing unit to monitor the product inventory count and detect the product inventory count approaching the lower limit, the product inventory count approaching the lower limit when the product inventory count falls below a notification level greater than the lower limit and between the lower limit and the upper limit, and
wherein the processor is further configured to increase the product inventory count in response to receipt of a shipment of one or more additional units of the product from the supplier attributable to detection of the product inventory count approaching the lower limit, the shipment of the one or more additional units of the product being pursuant to the open purchase order and independent of a separate purchase order from the customer directed to the one or more additional units.

7. An apparatus according to claim 6, wherein the processor is configured to store the product inventory count in an electronic file, and wherein the processor being configured to send the product inventory count includes being configured to send the electronic file including the product inventory count.

8. An apparatus according to claim 6, wherein each unit of the product includes an electronic identifier,
wherein the processor is configured to receive an indication of the electronic identifier of a unit having been read as the customer ships out the respective unit and, in response thereto, decrease the product inventory count, and
wherein the processor is configured to receive an indication of the electronic identifier of an additional unit having been read as the customer receives the respective additional unit and, in response thereto, increase the product inventory count.

9. An apparatus according to claim 6, wherein the lower limit is one unit below the upper limit.

10. A method comprising:
providing a processor disposed proximate a supplier of a system for providing a product from the supplier to a remote customer pursuant to an open purchase order that includes a total quantity of products the supplier is to provide to the customer for a contracted period of time, wherein open purchase order between the supplier and the customer defines an acceptable inventory range bounded by a lower and an upper limit for units of the product that the supplier provides to the customer, wherein the system includes a processing unit disposed proximate the customer and configured to maintain a product inventory count for the product representative of a number of units of the product that is maintained in inventory by the customer, the processing unit being configured to decrease the product inventory count as the customer ships out a unit of the product, and increase the product inventory count as the customer receives an additional unit of the product, and wherein the method further comprises:

monitoring the product inventory count;

detecting the product inventory count approaching the lower limit, the product inventory count approaching the respective lower limit when the product inventory count falls below a notification level greater than the lower limit and between the lower limit and the upper limit, wherein monitoring the product inventory count and detecting the product inventory count approaching the lower limit are performed by the processor being configured to monitor the product inventory count and detect the product inventory count approaching the lower limit; and generating a shipment request to the supplier when the processor has detected the product inventory count approaching the lower limit, the shipment request being generated to facilitate the supplier providing the customer with one or more additional units of the product pursuant to the open purchase order and independent of a separate purchase order directed to the one or more additional units.

11. A method according to claim 10 wherein the product inventory count is increased to within the acceptable inventory range once the customer receives the one or more additional units.

12. A method according to claim 11, wherein the product inventory count is increased to within the acceptable inventory range but is less than the upper limit once the customer receives the one or more additional units.

13. A method according to claim 10, wherein monitoring the product inventory includes:
receiving, from the processing unit, an electronic file including the product inventory count; and
monitoring the product inventory count from the electronic file.

14. A method according to claim 10, wherein the lower limit is one unit below the upper limit.

15. A method comprising:
providing a processor disposed proximate a customer of a system for providing a product from a remote supplier to the customer pursuant to an open purchase order that includes a total quantity of products the supplier is to provide to the customer for a contracted period of time, wherein the open purchase order between the supplier and the customer defines an acceptable inventory range bounded by a lower and an upper limit for units of the product that the supplier provides to the customer;

maintaining a product inventory count for the product representative of a number of units of the product that is maintained in inventory by the customer, maintaining the product inventory count including decreasing the product inventory count as the customer ships out a unit of the product, and increasing the product inventory count as the customer receives an additional unit of the product, wherein the system further includes a processing unit disposed proximate the supplier and configured to monitor the product inventory count and detect the product inventory count approaching the lower limit, and wherein the method further comprises:

sending the product inventory count to the processing unit to enable the processing unit to monitor the product inventory count and detect the product inventory count approaching the lower limit, the product inventory count approaching the lower limit when the product inventory count falls below a notification level greater than the lower limit and between the lower limit and the upper limit, wherein maintaining a product inventory count and sending the product inventory count are performed by the processor being configured to maintain the product inventory count and send the product inventory count, and increasing the product inventory count in response to receipt of a shipment of one or more additional units of the product from the supplier attributable to detection of the product inventory count approaching the lower limit, the shipment of the one or more additional units of the product being pursuant to the open purchase order and independent of a separate purchase order from the customer directed to the one or more additional units.

16. A method according to claim 15 further comprising storing the product inventory count in an electronic file, wherein sending the product inventory count comprises sending the electronic file including the product inventory count.

17. A method according to claim 15, wherein each unit of the product includes an electronic identifier, and wherein the method further comprises at least one of:
receiving an indication of the electronic identifier of a unit having been read as the customer ships out the respective unit and, in response thereto, decreasing the product inventory count; or
receiving an indication of the electronic identifier of an additional unit having been read as the customer receives the respective additional unit and, in response thereto, increasing the product inventory count.

18. A method according to claim 15, wherein the lower limit is one unit below the upper limit.

* * * * *